United States Patent [19]

Eckstein

[11] Patent Number: 5,303,300
[45] Date of Patent: Apr. 12, 1994

[54] SECURITY DOOR PHONE DEVICE

[76] Inventor: Donald Eckstein, 8125 SW. 205 Ter., Miami, Fla. 33189

[21] Appl. No.: 905,756

[22] Filed: Jun. 29, 1992

[51] Int. Cl.5 .................... H04M 11/00; E05B 45/06; A47B 67/02
[52] U.S. Cl. ................... 379/103; 379/102; 340/542; 312/215; 312/245
[58] Field of Search .................. 379/103, 92, 102, 51; 312/215, 245; 361/427; 340/542, 543; 248/27.1

[56] References Cited

U.S. PATENT DOCUMENTS

| | | | |
|---|---|---|---|
| 4,175,760 | 12/1992 | Ohashi et al. | 379/100 |
| 4,280,025 | 7/1981 | Carlberg | 379/445 |
| 4,646,160 | 2/1987 | Iizuka et al. | 379/92 |
| 4,764,953 | 8/1988 | Chern et al. | 379/103 |
| 4,937,855 | 6/1990 | McNab et al. | 379/103 |
| 4,943,997 | 7/1990 | Chang | 379/103 |

*Primary Examiner*—Curtis Kuntz
*Assistant Examiner*—Jason Chan
*Attorney, Agent, or Firm*—Robert M. Downey

[57] ABSTRACT

A security door phone device, to enable a user to speak with a person at their front door regardless of whether the user is in their home at the time, the device including a solid, durable, weather-resistant casing adapted to be securely mounted to a wall surface, the casing including a securely attached cover panel, a speaker and a microphone, a telephone line connection utilizing the speaker and microphone for normal two-way telephone communication, a memory adapted to store a selection of predetermined telephone numbers corresponding with select time periods, and a dialing button protruding through the cover panel and being structured and disposed to auto dial one of the predetermined numbers corresponding with the time period when the button is pushed. The device is easily programmed such that when the dialing button is pushed, the predetermined number will be called. A key pad and display enable the phone numbers and corresponding select time periods to be entered into memory.

5 Claims, 2 Drawing Sheets

U.S. Patent   Apr. 12, 1994   Sheet 1 of 2   5,303,300
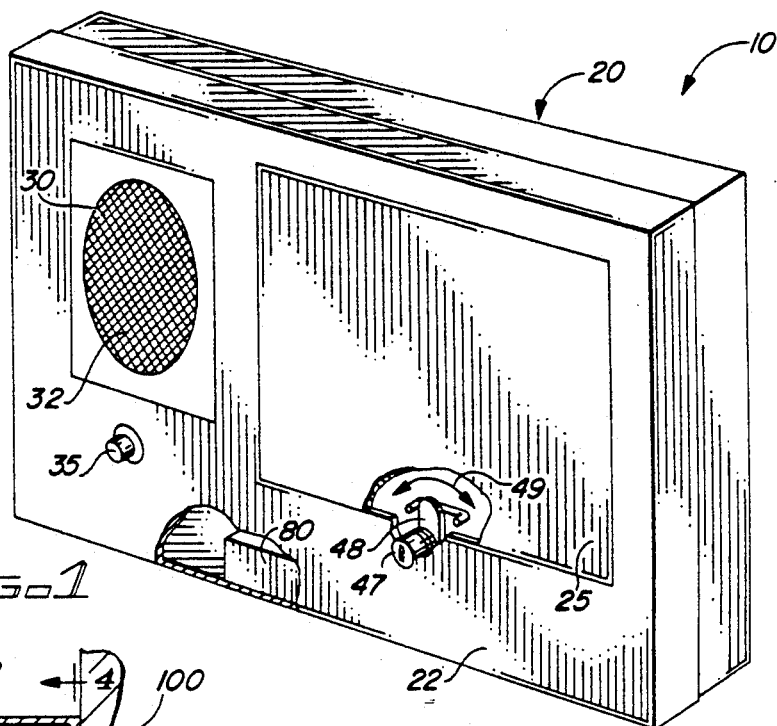
FIG-1
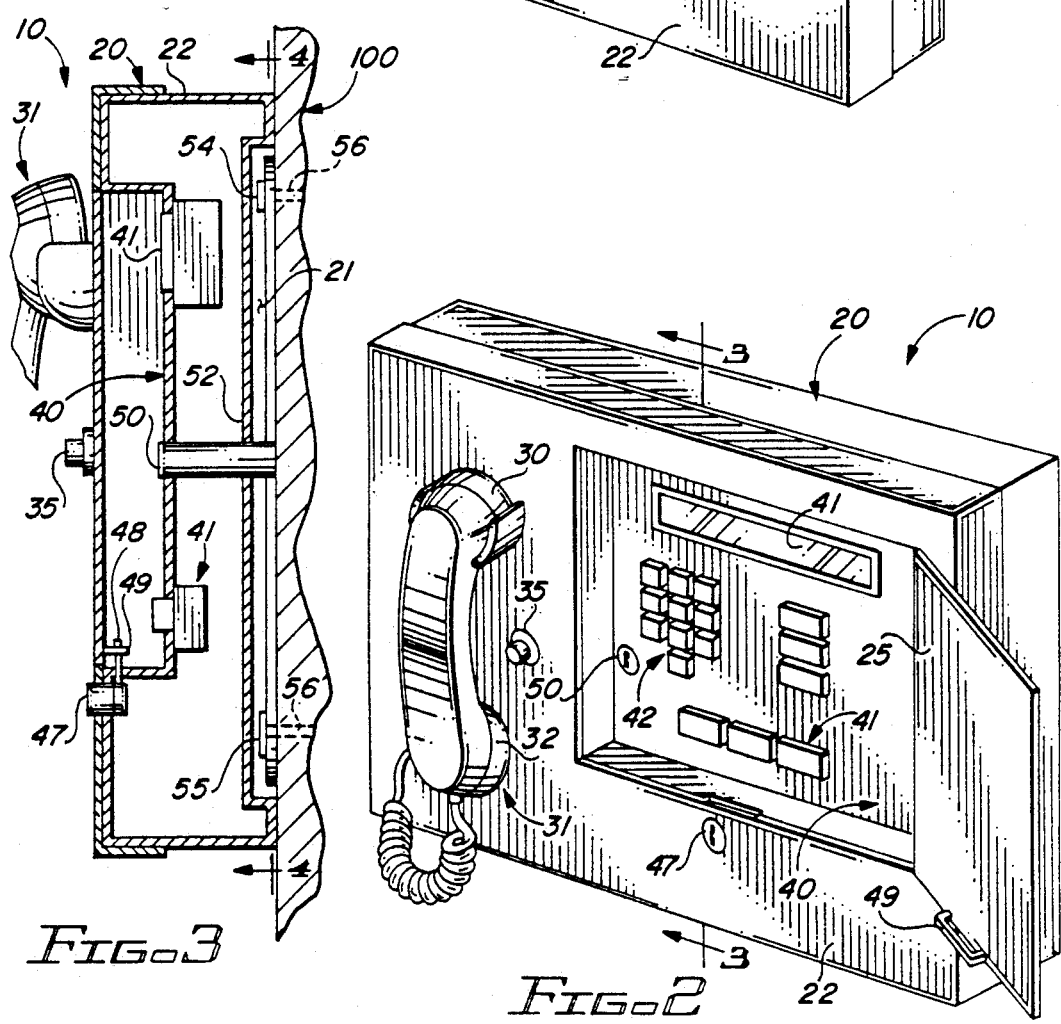
FIG-3
FIG-2

SECURITY DOOR PHONE DEVICE

BACKGROUND OF THE INVENTION

1. Field of the Invention

This invention relates to a security door phone device, to be installed at a residence or any other location where the identity of a visitor is desired before allowing entry, which enables a user to speak directly with a visitor at their door from any location, either in their home or at another location where there is a telephone, thereby providing an effective means of screening visitors or assuring that expected visitors are not missed.

2. Description of the Prior Art

Even with all of today's technological advances, one of the greatest problems and/or inconveniences encountered by every individual involves the greeting of visitors at their door. It may be merely a matter of inconvenience in trying to be rid of a persistent salesman, or the dangers of a stranger and potentially dangerous criminal who only needs an opened door. Additionally, there are the problems of not being home when wanted visitors come to the door. Examples of this can include friends or relatives who stop by and have no means of leaving a message if you are not home, or delivery or repairmen who often give imprecise estimates of when they will arrive, and who usually leave if no one is home. Almost everyone has had the experience of being in the yard or at a nearby neighbor's home when a welcomed caller came to the door and you wished you had known they were there. The device of the present invention attempts to meet the needs of all of these problems in a single device. In the past, there have been many intercom-type doorbell systems which will enable a person to speak to a visitor at the front door, however, these devices are limited, requiring the user to be home to receive notification. The device of the present invention enables a user in their home, or at another location, to be notified that there is someone at the door. Further, since most individuals have numerous telephones throughout their homes, the chance that a doorbell or buzzer will not be heard will be minimized. Once notified, an individual may screen the visitor by using an answering machine, much like when screening a normal telephone call and letting the answering machine take a message, or speaking to the person in a more comfortable communicative manner without having to speak through a door or actually open the door to speak to an unknown visitor. Additionally, the device of the present invention will enable a user who must leave their home, to program telephone numbers at which they may be reached at particular times such that when a visitor comes to the door, the phone number corresponding with the time the visitor is calling will be called so that the user can be reached to speak to a visitor. In this manner, a visitor will not know if the user is home or not, and welcomed visitors can be given instructions or be asked to wait if the user will arrive shortly. Such a use is of particular convenience with repair or delivery persons wherein homeowners are usually forced to remain in their home awaiting the imprecise arrival of the delivery o repair person. No door monitoring device known in the art is adapted to effectively enable a user to monitor and speak to a person at their door, wherein the user can be reached at various locations during predetermined time periods throughout the day.

SUMMARY OF THE INVENTION

The present invention is directed towards a security door phone device to be used to enable a user to monitor visitors at their door whether or not they are at home. The device includes a strong, solid, weather-resistant casing with a securely attached cover panel, thereby making the device easily utilized at an inside or outside location. Further included are a speaker and a microphone to enable audio communication between a visitor and a person at the door. Utilizing the speaker and the microphone for normal telephone communication are telephone line connection means which can either call the telephones of the location where the device is being used or call any telephone as desired by a user. A dialing button protrudes through the cover panel and is structured and disposed to auto dial a predetermined telephone number when pushed. This dialing button is the sole means by which the telephone line connection may be utilized, thereby giving the user complete control over where a person at the door calls. Additionally included and housed within the casing are programming means. The programming means are structured and disposed to enable the predetermined number which will be called when the dialing button is pushed to be entered and stored into the device's memory means. There may be a plurality of these predetermined numbers, each being programmed to correspond a particular time. As a result, a user who knows where they may be reached at particular times, or who is carrying a cellular phone, may program a telephone number and time during which they will be at that telephone number so as to assure that the visitor can always reach them no matter where they are at a given time. The programming means are accessible through a display panel concealed behind an access panel in the cover panel, for easy programmability. Control means of the device cause the predetermined number corresponding with the particular time when the dialing button is pushed to be retrieved from the memory means and called. Mounting means of the present invention enable the casing to be securely fastened to a wall or like surface at the location of use.

It is an object of the present invention to provide a security door phone device which will enable a user to program a plurality of telephone numbers and times during which those telephone numbers will be valid such that the user may be reached no matter where they are.

Yet another object of the present invention is to provide a device which will enable a user to screen the identity of visitors at their door utilizing an answering machine in the same manner in which they could screen telephone calls.

Still another object of the present invention is to enable a visitor to leave a message on an answering machine when no one is home.

A further object of the present invention is to provide a device which will enable a user to accessibly speak with an individual at their door without actually having to open the door or speak through the door.

Yet another object of the present invention is to provide a device which will enable a user to find out who is at their door without letting the visitor know whether the user is home or not.

Another object of the present invention is to provide a device which will enable a user to be assured that they

BRIEF DESCRIPTION OF THE DRAWINGS

For a fuller understanding of the nature of the present invention, reference should be had to the following detailed description taken in combination with the accompanying drawings in which:

FIG. 1 is a perspective, partial cutaway view of a first embodiment of the security door phone device.

FIG. 2 is a perspective view of a second embodiment of the security door phone device.

FIG. 3 is a cross-sectional view of the security door phone device along line 3-3 of FIG. 2.

Like reference numerals refer to like parts throughout the several views of the drawings.

DETAILED DESCRIPTION OF THE PREFERRED EMBODIMENT

Figure 4:
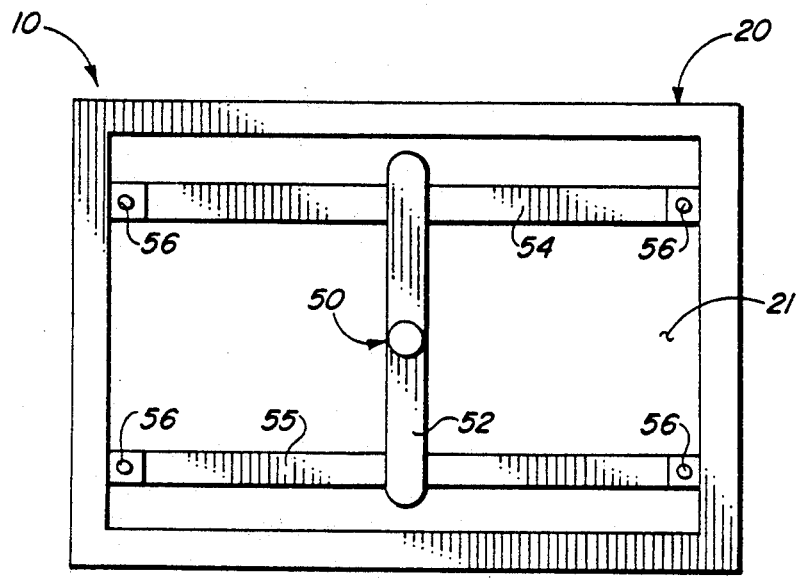
FIG. 4 is a rear view of the security door phone device along line 4-4 of FIG. 3.

As shown throughout FIGS. 1-5, the present invention is directed towards a security door phone device, generally indicated as 10, to be used to enable a person to monitor and speak with visitors at their door, even when they are not at home. The device 10 includes a solid, strong, weather-resistant casing 20 which may be made of weather-proofed steel o any like durable material. Included as part of the casing 20 is a cover panel 2 which contains the internal components of the security device 10 within the casing 20. As best seen in FIGS. 1 and 2, the cover panel 22 includes a hingedly attached access panel 25. The hingedly attached access panel 25 which opens to reveal a display -panel 40 includes a lock 47 to prevent unwanted opening of the access panel 25. The lock 47 includes a pivot arm 48 which rotates into locking position within a C-shaped bracket 49 secured to the inside of the access panel 25. The display panel 40 includes a digital readout 41, a plurality of programming buttons 43 and a standard telephone touch-tone key pad 42, all of which are utilized to access the programming means 70 of the security device 10. Further included as part of the security device 10 are receiver means including a speaker 30 and transmitting means including a microphone 32. As shown in FIG. 1, the speaker 30 and microphone 32 may be contained within the casing 20 and be accessible through the cover panel 22 for communication. Also, as best seen in FIG. 2, the microphone 32 and speaker 30 may be contained within a standard telephone receiver 31 hung on the cover panel 22 of the casing 20. Centrally disposed and protruding through the cover panel 22 is a dialing button 35. The dialing button 35 will be pushed when a visitor comes to the door and wishes to initiate communication. The security device 10, which functions utilizing normal electric power, includes a backup battery 80 contained within the casing 20 to assure that even during power outages, the security device 10 will be active.

Turning to FIGS. 3 and 4, the security device 10 is structured to be securely mounted to a wall surface 100 or any other sturdy structure upon which a user which is to attach the security device 10 to prevent removal. The security device 10 is removably locked into place by a lock 50 on the display panel 40, thereby making it accessible only if the access panel 25 is unlocked and opened. The lock 50 functions to turn a pivot arm 52 which protrudes within a recess 21 within the rear of the casing 20. The pivot arm 52 is disposed so as to lockingly engage a pair of mounting brackets 54 and 55, when turned to a locked position, and thereby prevent removal of the casing 20 from the mounting surface 100. The mounting brackets 54 and 55 are generally elongate C-shaped brackets which are bolted to the mounting surface 100 using a plurality of bolts 56. Although this is the preferred embodiment of mounting means, any mounting means capable of securing the casing 20 to a mounting surface 100 would be equally effective and appropriate.

Figure 5:
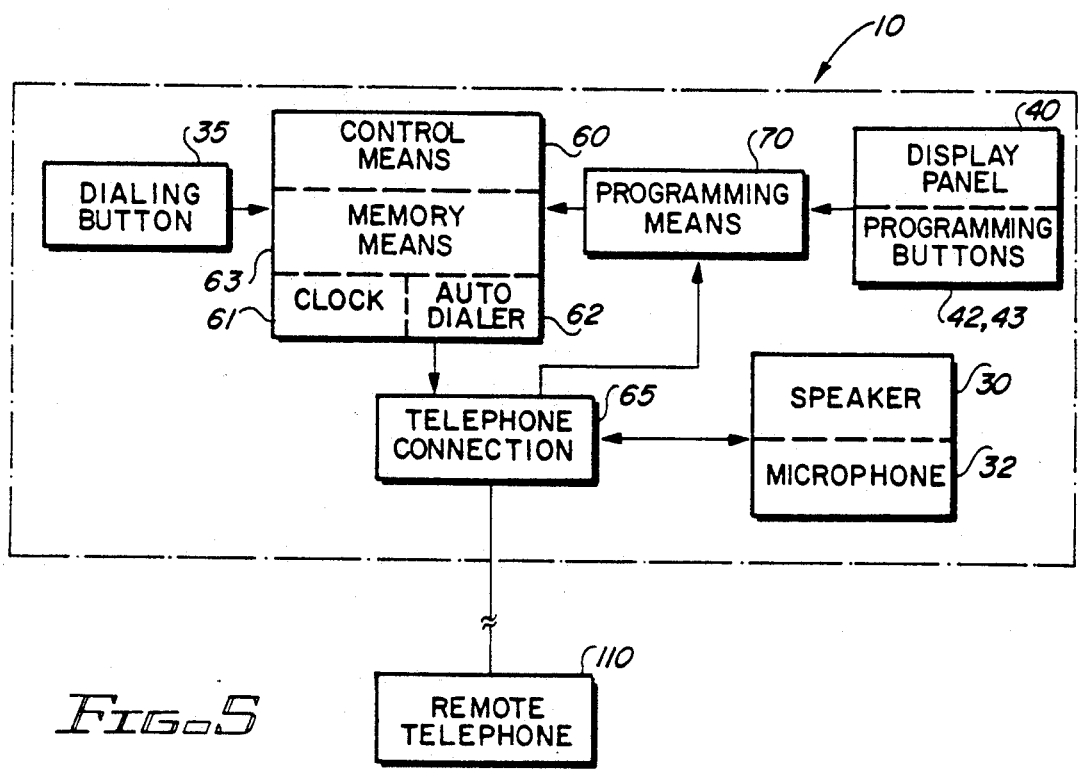
FIG. 5 is a schematic detailing the internal functioning of the security door phone device.

Referring to FIG. 5, the functioning of the security device 10 is initiated when a visitor presses the dialing button 35. The dialing button 35 when pushed directs control means 60 to retrieve a predetermined telephone number from memory means 63, included in the control means 60, and utilize an auto dialer 62 to make an appropriate telephone call. The control means 60 will only allow a predetermined telephone number to be dialed by the auto dialer 62, the predetermined number being designated by the owner of the security device 10. That predetermined number may be stored in the memory means 63 utilizing programming means 70. The programming means 70 which may be accessed by the programming buttons 42 and 43 on the display panel 40 will designate the specific number to be called, and additionally, a plurality of numbers may be programmed, each for a particular period of time. As a result, a user knowing they will be at various locations throughout the day may program a telephone number at which they may be reached during a particular designated time frame. Accordingly, when the dialing button 35 is pushed, the control means 60 checks with its internal clock 61 to determine what time it is and checks the particular telephone number that has been designated for that particular time. A default telephone number, usually the telephone number of the residence or place at which the security device 10 is located, is programmed for when no specific programming is inputted. The auto dialer 62 of the control means 60 utilizes a telephone line connection 65, included as part of the security device 10, to call whatever telephone 110 has been designed for that particular time. This remote telephone 110 may be a cellular telephone, a work phone, or any other telephone where a person wishes to be reached. If the telephone 110 is the telephone of the residence or location where the security device 10 is installed, the telephone connection 65 functions an intercom-type telephone system, thereby assuring that notification of a visitor is heard even when an individual is using the telephone. Also, no extra telephone line is required to allow calling of the residence telephone. When calling the telephone of the location at which the security device 10 is installed, a distinct ringing sound is desirous to indicate that not just an ordinary telephone call is being received, and since normal telephone lines are being used, a user anywhere within a location where a telephone is present will easily hear that there is someone waiting at the door. Utilizing the telephone connection 65, the person at the remote telephone 110 can communicate with a visitor at the security device 10 by means of the speaker and microphone 30 and 32. In addition to accessing the program means 70 through the display panel 40, the programming means 70 may be accessed through the telephone connection 65 from a remote telephone 110. As a result, a person whose plans change during the day may quickly and easily call to update the telephone number to be called during that particular time. In order to assure maximum security of access to the programming means, a private access code may be programmed such that only if the particular access code is inputted, either from the remote telephone 110 or on the numeric telephone pad 42, will the programming means 70 be accessed.

Now that the invention has been described,

What is claimed is:

1. A security communication device interconnected with a telephone line for transmitting and receiveing telephone call signals, said device comprising:

a durable, weather resistant housing including a hingedly attached cover panel, control means within said housing and interconnected with the telephone line and including memory means for storing a plurality of predetermined telephone numbers therein, each of said telephone numbers corresponding with a select time period, said control means further including programming means structured and disposed to facilitate entering said plurality of predetermined telephone numbers and the corresponding select time period into said memory means, wherein said programming means includes a private access code to enable operation thereof and a default telephone number, said default telephone number being a phone number at a location where the device is being used, dialing means for auto-dialing said predetermined telephone numbers, said control means further including clock means for monitoring the select time period associated with each of said corresponding telephone numbers, said control means being structured and disposed to identify a telephone number corresponding with the select time period and activate the telephone number for dialing during the corresponding select time period, a dialing button interconnected with said control means and structured to cause the activate telephone number to be accessed from said memory means and auto-dialed by said dialing means so as to transmit a call signal through said telephone line upon actuation of said dialing button, telephone line connection means interconnecting said memory means with said telephone line, wherein said telephone line connection means includes an intercom-type connection when the calling said default telephone number, said intercom-type connection causing a distinctly identifiable ring of a phone connected to the telephone line associated with said default telephone number, receiver means interconnected with said telephone line and including a speaker structured and disposed to audibly reproduce an audio signal received through said telephone line, transmitting means including a microphone structured and disposed to facilitate transmission of an audio signal through said telephone line, said programming means being operable from a remote telephone, mounting means for mounting said housing to a wall surface, and a recessed display panel having a plurality of programming buttons thereon structured and disposed to access said programming means, wherein said hingedly attached cover panel covers said recessed display panel, said cover panel having a lock to prevent unwanted access to said display panel, and wherein said mounting means includes a pair of brackets secured to said wall surface where said housing is to be mounted, said housing being securely locked to said brackets by a pivoting lock arm which is operably accessible for locking and unlocking movement thereof only through said display panel.

2. A device as recited in claim 1 wherein said speaker is mounted within said housing.

3. A device as recited in claim 2 wherein said microphone is mounted within said housing.

4. A device as recited in claim 3 wherein said speaker and said microphone are communicably accessed from an exterior of said housing through said cover panel.

5. A security communication device interconnected with a telephone line for transmitting and receiving telephone call signals, said device comprising:

a durable, weather resistant housing including a hingedly attached cover panel, control means within said housing and interconnected with the telephone line and including memory means for storing a plurality of predetermined telephone numbers therein each of said telephone numbers corresponding with a select time period, said control means further including programming means structured and disposed to facilitate entering said plurality of predetermined telephone numbers and the corresponding select time period into said memory means, dialing means for auto-dialing said predetermined telephone numbers, said control means further including clock means for monitoring the select time period associated with each of said corresponding telephone numbers, said control means being structured and disposed to identify a telephone number corresponding with the select time period, and being further structured to activate the telephone number for dialing during the corresponding select time period, a dialing button interconnected with said control means and structured to cause the activated telephone number to be accessed from said memory means and auto-dialed by said dialing means so as to transmit a call signal through said telephone line upon actuation of said dialing button.

telephone line connection means interconnecting said memory means with said telephone line, receiver means interconnected with said telephone line and including a speaker mounted within said housing and structured and disposed to audibly reproduce an audio signal received through said telephone line, transmitting means including a microphone mounted within said housing and structured and disposed to facilitate transmission of an audio signal through said telephone line, said speaker and said microphone being communicably accessible from an exterior of said housing through said cover panel, a recessed display panel having a plurality of programming buttons thereon structured and disposed to access said programming means, said programming means being operable from a remote telephone, and mounting means for mounting said housing to a wall surface and including a pair of brackets secured to said wall surface where said housing is to be mounted, said housing being securely locked to said brackets by a pivoting lock arm which is operably accessible for locking and unlocking movement thereof only through said display panel.

* * * * *